UNITED STATES PATENT OFFICE.

SOPHIA POTTER, OF CLEMENTSVALE, NOVA SCOTIA, CANADA.

LINIMENT.

SPECIFICATION forming part of Letters Patent No. 298,706, dated May 13, 1884.

Application filed April 19, 1883. Renewed February 5, 1884. (No specimens.)

*To all whom it may concern:*

Be it known that I, SOPHIA POTTER, of Clementsvale, in the county of Annapolis and Province of Nova Scotia, Dominion of Canada, have discovered a certain new and useful Medical Compound; and I do hereby declare that the following is a full, clear, and exact description thereof, which will enable others skilled in the art to which it appertains to make and use the same.

My invention has relation to liniments for the treatment of rheumatism and other kindred complaints; and it consists in the specific compound of ingredients hereinafter more fully described, and mixed in the manner set forth.

To prepare this liniment I take a suitable quantity of the leaves of the pitcher-plant, (*Nepenthe distillatoria*,) cut it fine, and steep it in a suitable quantity of boiling water to make a strong decoction, after which I dissolve one-half pound of saltpeter in each pint of the decoction. Next I dissolve two ounces of gum-camphor in one pint of alcohol. In order to prepare the liniment, I then mix in a quart bottle the following ingredients, viz: one pint of porpoise-oil, two ounces of the pitcher-plant decoction, two ounces of the spirits of camphor formed by dissolving the gum-camphor in the alcohol, three ounces of the spirits of turpentine, and one ounce of laudanum. This should be mixed well by shaking the bottle freely, after which I add one and one-half ounce of the best English spirits of ammonia. I then again mix the whole thoroughly by agitating the bottle; or if the liniment is to be prepared in large quantities the several ingredients may be mixed in the same proportions by the use of an ordinary churn, or in any other desired manner, by which I insure a thorough mixing, care being taken to keep it well stirred while bottling, after which the liniment is ready for use. It is applied by bathing and rubbing the affected parts freely; and I have found by experience that it may be used with advantage in relieving a great many other ailments, more especially nervous affections.

I am aware that several of the ingredients herein specified have been used separately or in other compounds; but I am not aware that the same have ever been used before in the proportions and combinations hereinbefore specified.

I therefore claim and desire to secure by Letters Patent of the United States—

The hereinbefore-described medical compound or liniment, composed of spirits of camphor, decoction of the leaves of the pitcher-plant, (*Nepenthe distillatoria*,) saltpeter, porpoise-oil, turpentine, laudanum, and spirits of ammonia, mixed in about the proportions set forth.

In testimony that I claim the foregoing as my own I have hereunto affixed my signature in presence of two witnesses.

SOPHIA POTTER.

Witnesses:
 ALFD. H. ELLIS,
 R. C. HAMILTON.